(12) United States Patent
Falkner et al.

(10) Patent No.: US 7,144,024 B2
(45) Date of Patent: Dec. 5, 2006

(54) RIDE ALONG QUICK RELEASE DOLL CARRIER AND DOLL HELMET

(76) Inventors: Carol Falkner, 10 Von Hagen St., St. James, NY (US) 11780; Rachel Condron, 11 Von Hagen St., St. James, NY (US) 11780

( * ) Notice: Subject to any disclaimer, the term of this patent is extended or adjusted under 35 U.S.C. 154(b) by 197 days.

(21) Appl. No.: 10/803,796

(22) Filed: Mar. 18, 2004

(65) Prior Publication Data

US 2004/0245741 A1  Dec. 9, 2004

(51) Int. Cl.
*B62J 1/14* (2006.01)
*B62J 7/04* (2006.01)

(52) U.S. Cl. ............ 280/202; 224/415; 224/426; 224/427

(58) Field of Classification Search .......... 280/202, 280/204, 288.1, 304.4; 224/415, 416, 421, 224/452
See application file for complete search history.

(56) References Cited

U.S. PATENT DOCUMENTS

| | | | | |
|---|---|---|---|---|
| 453,212 A * | 6/1891 | Sager | ............... | 297/129 |
| 480,760 A * | 8/1892 | Blood | ............... | 280/202 |
| 843,094 A * | 2/1907 | Paterson et al. | ...... | 280/202 |
| 2,498,446 A * | 2/1950 | Pawsat | ............ | 224/421 |
| 2,531,902 A * | 11/1950 | Baron | ............... | 224/452 |
| 2,700,493 A * | 1/1955 | Meier, Jr. | ......... | 224/431 |
| 3,318,615 A * | 5/1967 | Chreist, Jr. | ...... | 280/288.4 |
| 4,305,532 A * | 12/1981 | Reminger | ......... | 224/416 |
| 4,440,331 A * | 4/1984 | Schimmels | ........ | 224/415 |
| 5,845,830 A * | 12/1998 | Dreiling | .......... | 224/415 |
| 5,971,832 A * | 10/1999 | Siboni | ............ | 446/279 |
| 6,173,980 B1 * | 1/2001 | Newbold et al. | .... | 280/202 |
| 6,511,359 B1 * | 1/2003 | Lui | ................. | 446/321 |

* cited by examiner

*Primary Examiner*—Anne Marie Boehler
(74) *Attorney, Agent, or Firm*—Alfred M. Walker

(57) ABSTRACT

A manually maneuverable, quick release ride along miniature bicycle doll carrier, for holding a doll wearing a helmet therein, is mounted on a child's bicycle frame. The bicycle doll carrier functions as an important safety teaching element for the child playing with the doll, the doll's helmet and the doll seat carrier. A front mounting clamp is rigidly attached to the bicycle seat carrier post to or receive one of the quick release elements. The doll carrier is retained to the bicycle by front and rear support rod assemblies, which compose the quick release elements. For attachment by the child, the carrier with the pre-attached front support rods and rear support rod assembly is carried to the bicycle by the child. The quick release ends of the rear rod assembly are twisted to engage the bicycle frame members. Then the front support rods are guided to engage ends within angled holes in a front mounting clamp located upon the steering post of the bicycle. The carrier is the rigidly attached to the child's bicycle.

4 Claims, 3 Drawing Sheets

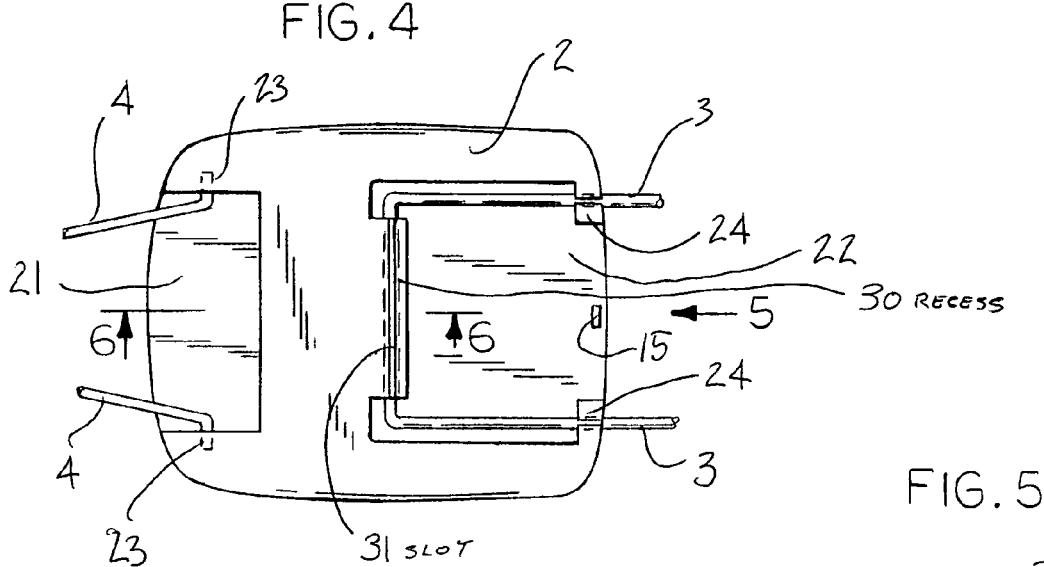
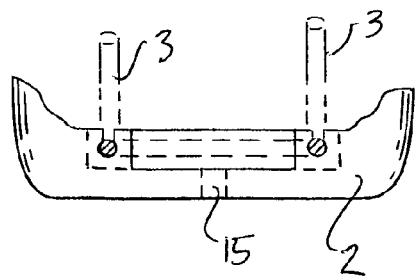
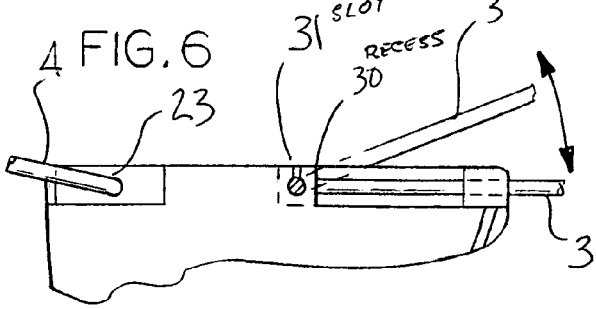
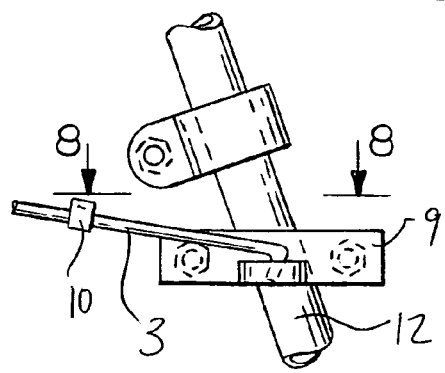
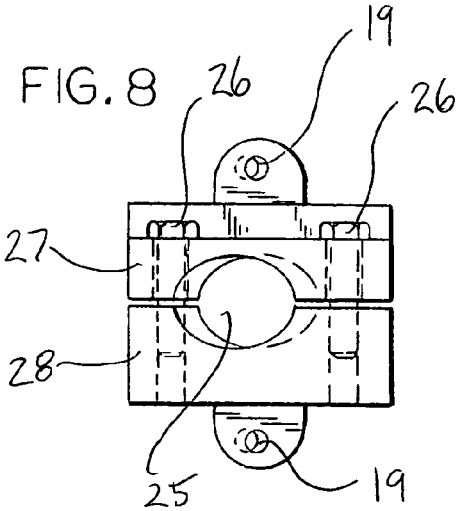

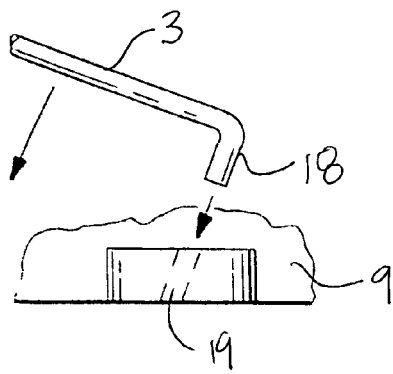
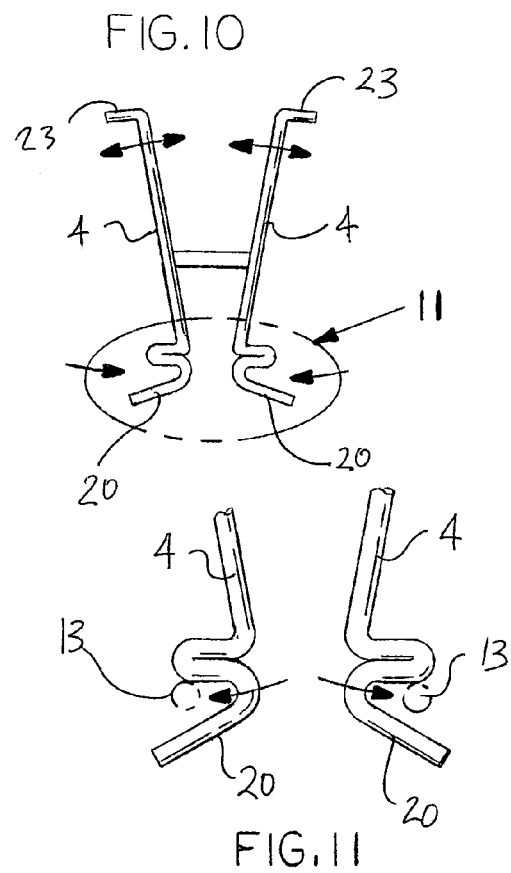
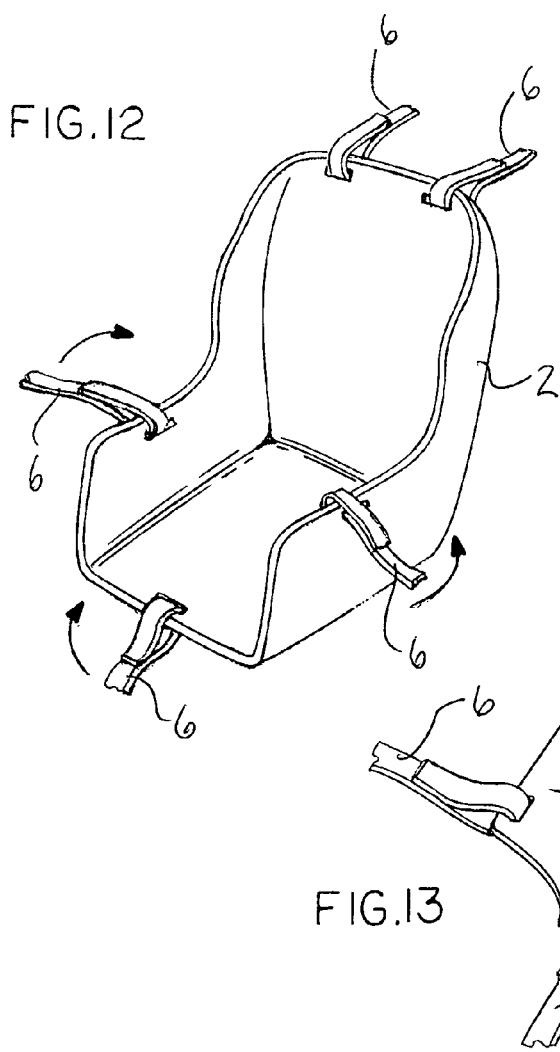

RIDE ALONG QUICK RELEASE DOLL CARRIER AND DOLL HELMET

FIELD OF THE INVENTION

The present invention relates to a ride along quick release child's bicycle seat carrier and accessory helmet for a doll.

BACKGROUND OF THE INVENTION

Playing with dolls is a centuries old tradition among children. It enables children to imitate adult activities, such as responsible child care and personal safety. Providing a child with other accessories for dolls enhances the imagination, and helps the child perform recreational activities that mimic daily life.

For example, to imitate the transporting of a child in a bicycle seat of an adult bicycle, children's bicycles are provided with miniature bicycle seat carriers to carry dolls therein.

However, these miniature bicycle seat carriers are usually bolted to the bicycle. However, when bolted to a bicycle, the doll carrier cannot be removed by a child, and only by an adult with tools.

Therefore, there will be situations where the child wants to temporarily remove the bicycle seat carrier under certain circumstances, such as to decorate the bicycle for a parade, to attach an accessory trailer to the bicycle or to ride unencumbered in fields and meadows.

Under such circumstances, it would be desirable to have a child's bicycle seat carrier for a doll, which can be quickly and easily removed by the little nimble hands of a child.

Among related patents include U.S. Pat. No. 5,845,830 of Dreiling, which discloses a cantilevered bicycle seat carrier for a doll, but which has a complicated, not easily releasable clamp to hold the carrier to the bicycle frame.

In addition, U.S. Pat. Nos. 3,318,615 of Chreist and 1,410,547 of Bobbitt both describe bolted-on doll bicycle seat carriers that can't be easily released by a child. The front doll bicycle seat carrier of U.S. Design Pat. No. Des. 281,964 of Rudell is also bolted to the frame.

Even the conventional infant-carrying carrier for a human infant, as described in U.S. Pat. No. 4,022,488 of Likas, is permanently bolted to the bicycle frame.

OBJECTS OF THE INVENTION

It is therefore an object of the present invention to provide a quick release ride along child's bicycle seat carrier for a doll.

Other objects which become apparent from the following description of the present invention.

SUMMARY OF THE INVENTION

In keeping with these objects and others, which may become apparent, the present invention is a quick release ride along child's bicycle seat carrier for a doll. To help teach children about bicycle safety, the doll is provided with a miniature doll-sized helmet to be worn while the doll rides along with the child riding a bicycle.

The seat carrier includes a quick release latch, which can easily be manipulated by a child. VELCRO® retaining straps are optional and supplementary to the primary latch release.

The doll's bicycle seat carrier is a cantilevered bicycle seat carrier for a doll, which is an uncomplicated, easily releasable clamp to hold the carrier to the child's bicycle frame.

BRIEF DESCRIPTION OF THE DRAWINGS

The present invention can best be understood in connection with the accompanying drawings. It is noted that the invention is not limited to the precise embodiments shown in drawings, in which:

FIG. 4 is a bottom plan view taken along the lines 4—4 of FIG. 2;

FIG. 5 is a partial front elevational view taken in the direction of Arrow 5 of FIG. 4, to show engagement of holding means;

FIG. 6 is a partial sectioned view taken along lines 6—6 of FIG. 4;

FIG. 7 is an enlarged partial view taken within the ellipse 7 of FIG. 2;

FIG. 8 is a top plan view taken along lines 8—8 of FIG. 7;

FIG. 9 is an enlarged partial view illustrating the anchoring means at the cycle seat post;

FIG. 10 is a plan view of the rear anchoring means from underside of the auxiliary carrier to existing frame;

FIG. 11 is an enlarged partial view taken within the ellipse 11 of FIG. 10;

FIG. 12 is an enlarged diagrammatic perspective view of the auxiliary carrier of the present invention; and, FIG. 13 is an enlarged diagrammatic view of the central doll-retaining web panel, holding all strap ties from the carrier.

DETAILED DESCRIPTION OF THE INVENTION

Figure 1:
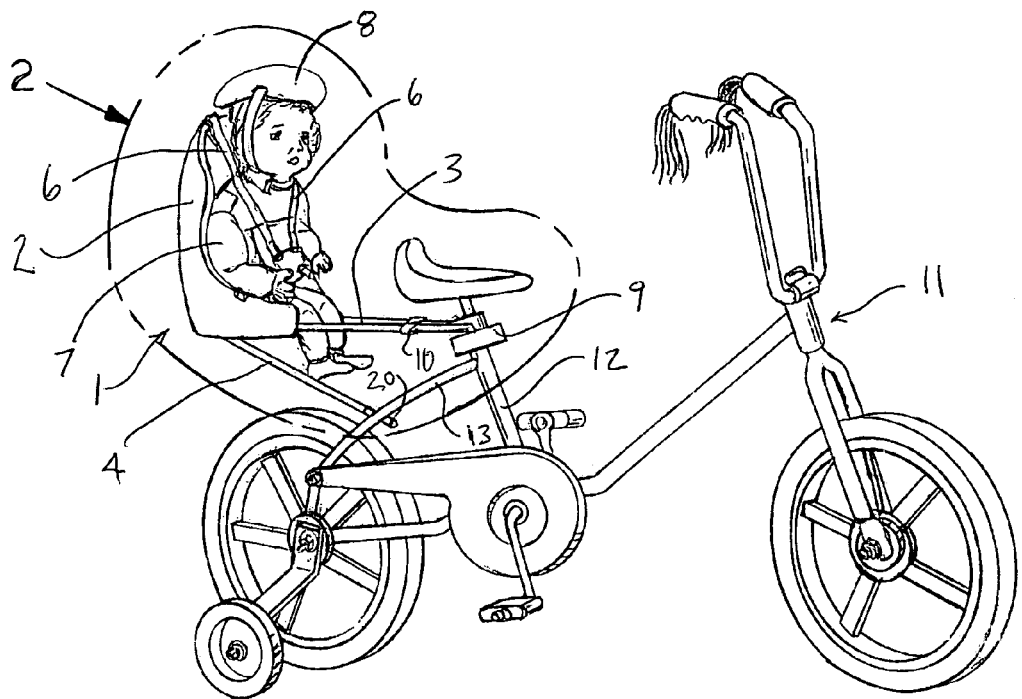
FIG. 1 is a diagrammatic perspective view of the quick release ride along child's bicycle seat carrier, for a doll, of the present invention.

FIG. 1 shows the quick release ride along bicycle doll carrier 1 of this invention, as mounted on child's bicycle 11. A doll 7 is secured in seat 2 via straps 6 and web panel 5. Doll 7 is depicted as preferably wearing bicycle helmet 8. This is an important safety teaching element for the child playing with this invention.

While the entire doll carrier 1 is removable by a child using quick release latching elements, a front mounting clamp 9 is rigidly attached to seat post 12 of bicycle 11, for receiving one of the quick release elements. Carrier 2 is retained to bicycle 11 by front support rods 3 and rear support rod assembly 4, which compose the quick release elements. Dual bicycle frame members 13 engage rod assembly 4.

Figure 2:
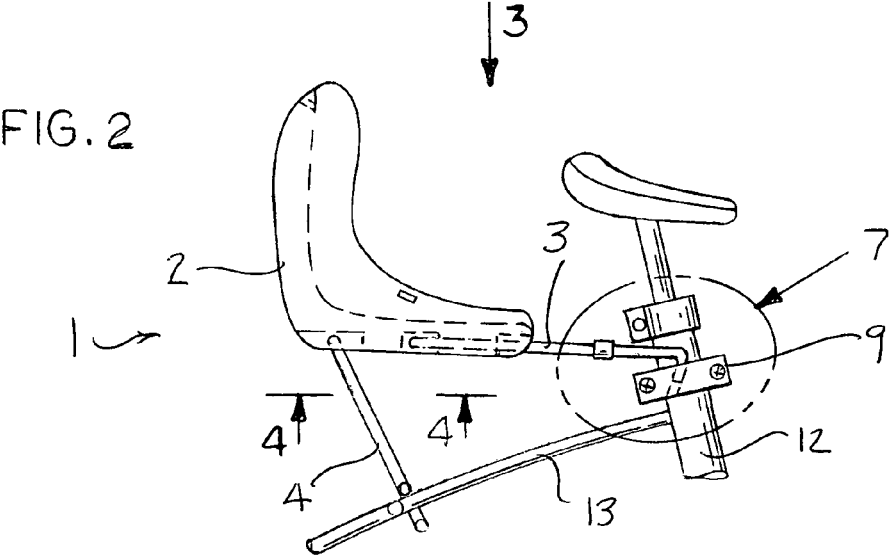
FIG. 2 is a partial elevational view taken within the ellipse 2 of FIG. 1, with the doll removed for clarity.
Figure 3:
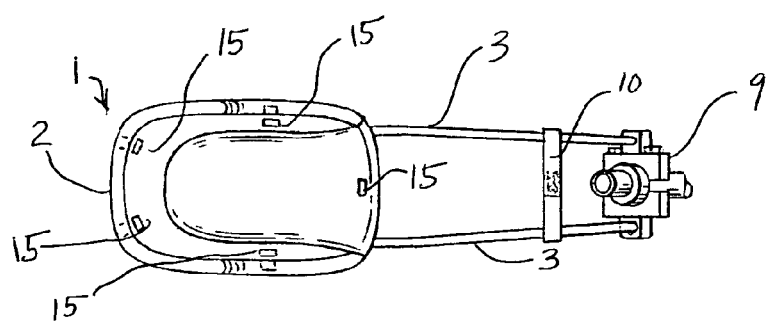
FIG. 3 is a top plan view taken in the direction of Arrow 3 of FIG. 2.

The side view of FIG. 2 and the top view of FIG. 3 provide a general understanding of the geometric relation between the various parts. Slotted holes 15 in carrier 2 permit straps 6 to be anchored within. Auxiliary strap 10 around front support rods 3 has hook and loop fasteners (such as VELCRO®) to snug up the front attachment to mounting clamp 9.

The bottom view of carrier 2 in FIG. 4 shows the proximal ends of front support rods 3 and rear support rod assembly 4 with bent ends 23. Ends 23 fit into holes in the sides of rear carrier recess 21, which is a molded feature. The proximal ends 23 of rear support rod assembly 4 must be temporarily forced toward each other to accomplish this so that they snap into the holes. Front support rods 3 are formed at the rear into a continuous rectangular loop which is assembled and retained to carrier 2 by snapping into molded hinge recess 30 through slot 31 which is slightly less wide than the diameter of rods 3.

By swinging rods 3 down, as shown in FIG. 6, while forcing the distal ends toward each other, they are snapped into molded front carrier recess 22 under molded retaining wings 24.

FIG. 5 shows an alternate view of this carrier 2 and rods 3 detail. These are one-time operations, which are not intended to be performed by the child.

FIGS. 7, 8, and 9 show details of front mounting clamp 9. Clamp 9 includes two halves 27 and 28 which are attached over bicycle seat carrier post 12 and then fastened together by bolts 26 such that hole 25 exerts a force attaching clamp 9 to post 12. The distal ends 18 of rods 3 are bent at right angles and are received by angled holes 19 in front mounting clamp 9.

FIG. 10 shows rear support rod assembly 4 with distal quick release elements 20 (shown as an enlargement in FIG. 11). They are simply twisted between bicycle rear frame members 13 to fit as shown in FIG. 11.

FIGS. 12 and 13 show the attachment of straps 6 to carrier 2 and to doll retaining web panel 5 respectively. The ends of straps 6 have matching patches of hook and loop fastener material (such as VELCRO®), to enable them to be attached or detached through the holes provided. If a toy figure with fuzzy material (such as a bear) is used instead of a doll, web panel 5 can be deleted and the ends of straps 6 can be adhered directly to its surface via the "hook" patches at their ends.

The method of attachment of bicycle doll carrier 1 to bicycle 11 is a quick and simple procedure intended to be accomplished by a child. Carrier 2 with pre-attached front support rods 3 and rear support rod assembly 4 is carried to bicycle 11. Quick release ends 20 of rod assembly 4 is twisted to engage bicycle frame members 13. Then front support rods 3 are guided to engage ends 18 within angled holes 19 in front mounting clamp 9. The carrier 2 is rigidly attached at this point. Strap 10 is then wrapped around front support rods 3 and attached via its VELCRO® end patches. Detachment of bicycle doll carrier 1 is simply the reverse procedure.

The exact configuration of the quick release members can be varied, so long as the manual pressure needed by a child grasping the release member from a removably lockable position within a locking member, to a releasable position, loosening it from a nesting position and detaching the carrier from the bicycle frame and can be achieved.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention.

We claim:

1. A manually maneuverable, quick release ride along miniature bicycle doll carrier, for holding a doll wearing a helmet therein, wherein the doll carrier is mounted on a child's bicycle frame, said carrier comprising: a doll seat carrier, said carrier having a mounting clamp being removably attachable to the frame of said bicycle, wherein said carrier includes a pair of pre-attached front support rods and a pair of rear support rods, each said rod having a respective quick release distal end attachable to said bicycle frame, wherein further proximal ends of said front support rods and said rear support rods each include bent ends fitting in respective front and rear recesses, wherein further respective proximal ends of said rear support rods are temporarily forced toward each other to snap into said rear recesses; wherein further said front support rods are retained to said carrier by snapping into respective front recesses; wherein further, by swinging said front rods down, while forcing said respective distal ends toward each other, said front rods are snapped into said respective front recesses; wherein further distal ends of said rear support rods are squeezed inward between respective bicycle frame members extending between a seat post of said bicycle and a rear wheel of said bicycle, and released until said distal ends of said rear support rods engage said bicycle frame members.

2. The carrier as in claim 1 wherein respective quick release ends of said rear rods are twisted to engage the bicycle frame.

3. The carrier as in claim 1 wherein said front support rods are guided to engage respective ends within respective holes in a front mounting clamp located upon the seat post of the bicycle.

4. The carrier as in claim 1 further comprising an accessory doll helmet.

* * * * *